United States Patent
Ghannam et al.

(10) Patent No.: US 10,919,347 B2
(45) Date of Patent: Feb. 16, 2021

(54) VEHICLE TIRE PRESSURE MONITORING SYSTEM

(71) Applicant: Ford Global Technologies, LLC, Dearborn, MI (US)

(72) Inventors: Mahmoud Yousef Ghannam, Canton, MI (US); Brian Bennie, Sterling Heights, MI (US); Dilip B. Patel, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 124 days.

(21) Appl. No.: 16/439,283

(22) Filed: Jun. 12, 2019

(65) Prior Publication Data

US 2020/0391558 A1    Dec. 17, 2020

(51) Int. Cl.
*G08B 3/00* (2006.01)
*B60C 23/04* (2006.01)

(52) U.S. Cl.
CPC ............ *B60C 23/0471* (2013.01); *G08B 3/00* (2013.01)

(58) Field of Classification Search
CPC ....... B60C 23/00; B60C 23/0471; G08B 3/00; G01C 17/00
USPC .......................................... 701/29.2; 340/442
See application file for complete search history.

(56) References Cited

U.S. PATENT DOCUMENTS

| 8,087,301 B2* | 1/2012 | Hammerschmidt .. G06T 7/0004 73/800 |
| 9,475,351 B2 | 10/2016 | Yeom |
| 10,247,543 B2* | 4/2019 | Rhoades .............. H04N 5/2256 |
| 2003/0117275 A1* | 6/2003 | Watkins .................. B60C 23/20 340/442 |
| 2013/0278771 A1* | 10/2013 | Magoun ................ B60C 23/068 348/148 |
| 2018/0304697 A1 | 10/2018 | Woodley et al. |

FOREIGN PATENT DOCUMENTS

| EP | 2468572 A1 | 6/2012 |
| JP | 2005096554 A | 4/2005 |
| JP | 2007038730 A | 2/2007 |

* cited by examiner

*Primary Examiner* — Eric Blount
(74) *Attorney, Agent, or Firm* — Frank Lollo; Bejin Bieneman PLC (57) ABSTRACT

A system includes a computer having a processor and a memory storing instructions executable by the processor to acquire a first image of a tire of a vehicle upon shutdown of the vehicle. The instructions include instruction to then, upon startup of the vehicle, and in response to determining that the tire is unmoved since the shutdown and, in response, acquire a second image of the tire. The instructions include instruction to actuate a component of the vehicle in response to determining that the first image is different that the second image.

20 Claims, 4 Drawing Sheets

VEHICLE TIRE PRESSURE MONITORING SYSTEM

BACKGROUND

A vehicle may include a tire pressure monitoring system that detects air pressure of tires of the vehicle. The tire pressure monitoring system may include wireless pressures sensor supported by a wheel of each tire. Each of the wireless pressure sensors are typically provided with power from a respective dedicated battery.

DETAILED DESCRIPTION

A system includes a computer having a processor and a memory storing instructions executable by the processor to acquire a first image of a tire of a vehicle upon shutdown of the vehicle. The instructions include instruction to then, upon startup of the vehicle, and in response to determining that the tire is unmoved since the shutdown and, in response, acquire a second image of the tire. The instructions include instruction to actuate a component of the vehicle in response to determining that the first image is different that the second image.

The instructions may further include instructions to, upon startup of the vehicle, determine that the tire is moved since the shutdown and, in response, actuate a tire pressure sensor of the tire.

The instructions may further include instructions to determine that the tire is moved by detecting as least one of removal of the tire, rotation of the tire, or change of a steering angle of the tire.

The instructions may further include instructions to store an error code in the memory of the computer in response to determining that the first image is different that the second image.

The instructions may further include instructions to store data specifying a position of the tire relative to the vehicle along with the error code.

The instructions may further include instructions to determine that the first image is different than the second image based on a position of the tire relative to a body of the vehicle in the first image being different from a position of the tire relative to the body of the vehicle in the second image by a threshold amount.

The instructions may further include instructions to determine that the first image is different than the second image based on a shape of the tire in the first image being different from a shape of the tire in the second image by a threshold amount.

The instructions may further include instructions to actuate a wireless tire pressure sensor to a low power state upon shutdown of the vehicle.

The instructions may further include instructions to maintain the wireless tire pressure sensor in the lower power state until acquired images are determined as different from each other.

The system may include a tire pressure sensor in wireless communication with the computer.

The instructions may further include instructions to determine that a first ambient temperature during shutdown of the vehicle is different from a second ambient temperature during startup of the vehicle and, in response, actuate a tire pressure sensor of the tire.

A method includes acquiring a first image of a tire of a vehicle upon shutdown of the vehicle. The method includes then, upon startup of the vehicle, and in response to determining that the tire is one of moved or unmoved since the shutdown. The method includes, in response to determining the tire is unmoved since the shutdown, acquiring a second image of the tire and actuating a component of the vehicle in response to determining that the first image is different that the second image. The method includes, in response to determining the tire is moved since the shutdown, actuating a tire pressure sensor of the tire.

The method may include determining that the tire is moved by detecting as least one of removal of the tire, rotation of the tire, or change of a steering angle of the tire.

The method may include storing an error code in response to determining that the first image is different that the second image.

The method may include storing data specifying a position of the tire relative to the vehicle along with the error code.

The method may include determining that the first image is different than the second image based on a position of the tire relative to a body of the vehicle in the first image being different from a position of the tire relative to the body of the vehicle in the second image by a threshold amount.

The method may include determining that the first image is different than the second image based on a shape of the tire in the first image being different from a shape of the tire in the second image by a threshold amount.

The method may include actuating a wireless tire pressure sensor to a low power state upon shutdown of the vehicle.

The method may include maintaining the wireless tire pressure sensor in the lower power state until acquired images are determined as different from each other.

The method may include comprising determining that a first ambient temperature during shutdown of the vehicle is different from a second ambient temperature during startup of the vehicle and, in response, actuate a tire pressure sensor of the tire.

A computer readable medium may store instructions executable by a processor to perform the method.

A system includes a computer having a processor and a memory storing instructions executable by the processor to perform the method.

The presently disclosed and claimed system provides efficient use of resources, e.g., efficient use of electricity from a battery of the tire pressure sensor by controlling when data is collected and transmitted by the tire pressure. In other words, the system saves energy of the battery by monitoring the tires with image analysis to control when the tire pressure sensor is in a "high power" or "low power" state.

Figure 1:
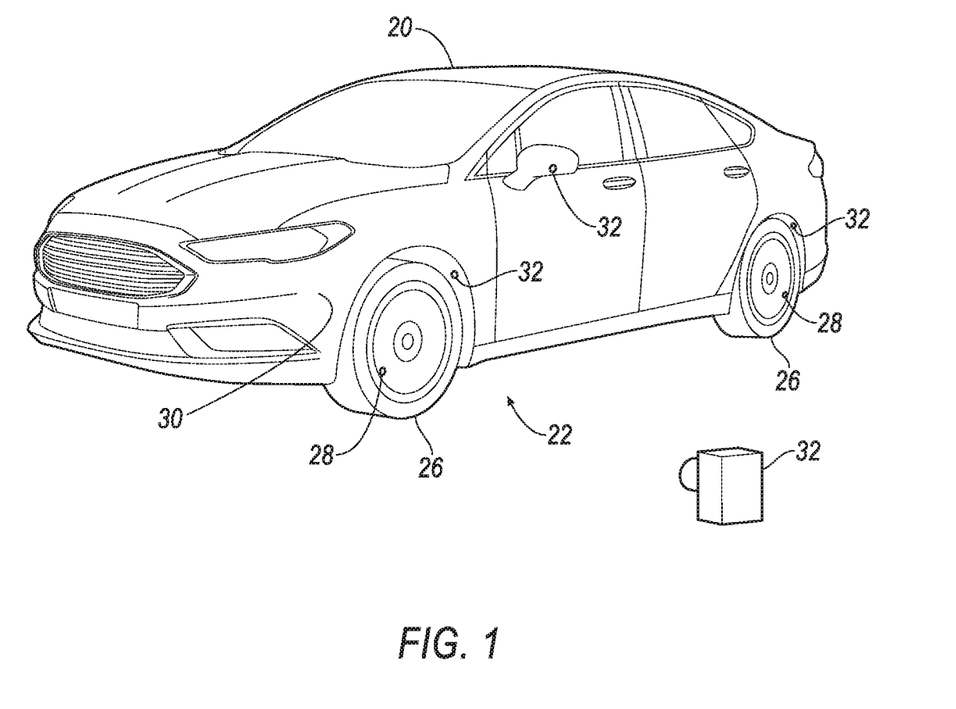
FIG. 1 is a block diagram of a vehicle having a tire pressure monitoring system.
Figure 2:
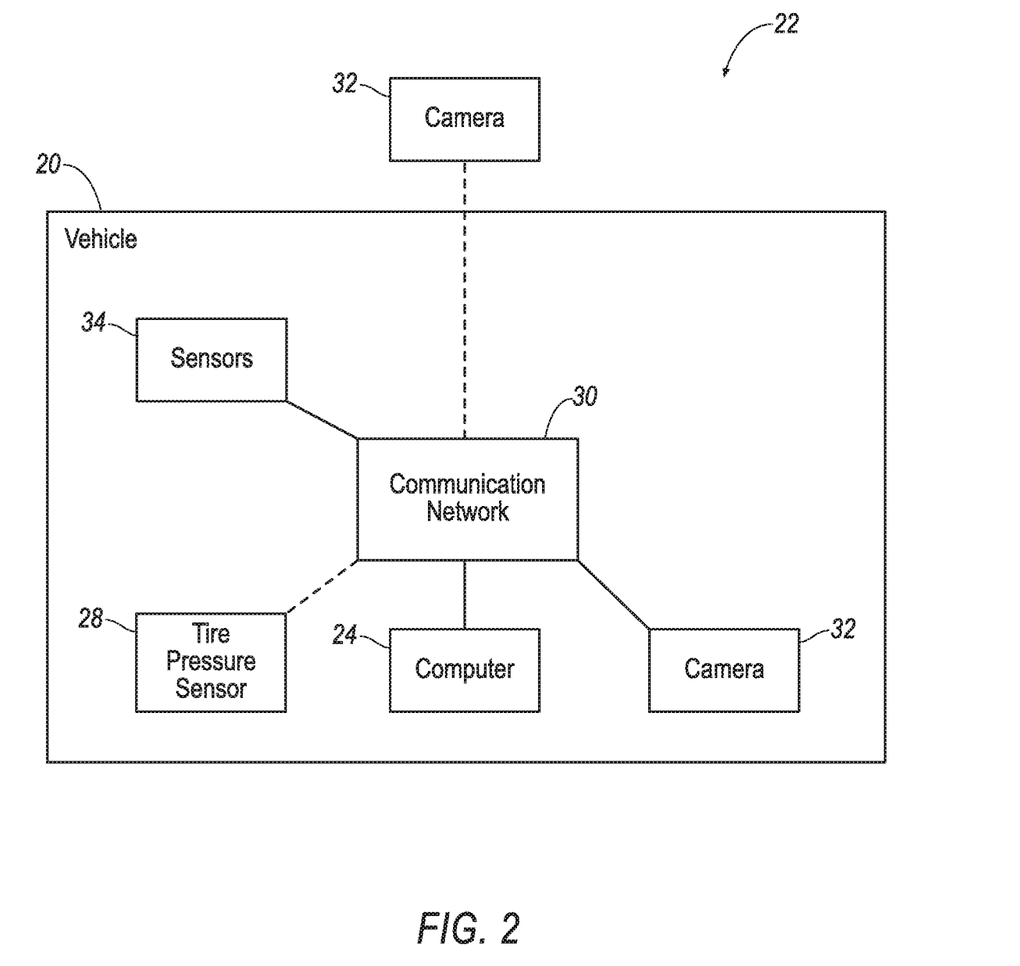
FIG. 2 is an illustration of a perspective view of the vehicle.

FIGS. 1 and 2 illustrate a vehicle 20 having a tire pressure monitoring system 22. The system 22 includes a computer 24 having a processor and a memory storing instructions executable by the processor to acquire a first image 300 (illustrated in FIG. 3) of a tire 26 of the vehicle 20 upon shutdown of the vehicle 20, then, upon startup of the vehicle 20, and in response to determining that the tire 26 is unmoved since the shutdown, acquire a second image 400 (illustrated in FIG. 4) of the tire 26. The instructions include instructions to actuate a component of the vehicle 20, such as the memory of the computer 24 and/or a tire pressure sensor 28, in response to determining that the first image 300 is different that the second image 400.

Shutdown of the vehicle 20 includes commanding various systems and components of the vehicle 20 to an "off" or "low power" state in which operation of the vehicle 20 is restricted and fewer (if any) resources are used, e.g., as compared to the vehicle 20 in an "on" or "high power" state. For example, the computer 24 may command an engine to an "off" state in which a crankshaft of the engine is not rotating. As another example, the computer 24 may command a navigation system of the vehicle 20 to a "sleep" state in which various data collectors are actuated at less frequent intervals.

Startup of the vehicle 20 includes commanding various systems and components of the vehicle 20 to the "on" or "high power" state in which operation of the vehicle 20 is permitted and more resources are used. For example, the computer 24 may command an engine to an "on" state in which a crankshaft of the engine is rotating. As another example, the computer 24 may command the navigation system of the vehicle 20 to a "high power" state in which various data collectors are actuated at more frequent intervals (as compared to in a "low power" state).

The vehicle 20 may be any type of passenger or commercial vehicle such as a car, a truck, a sport utility vehicle, a crossover vehicle, a van, a minivan, a taxi, a bus, etc.

The vehicle 20 may include tires 26 and wheels supporting the tires 26. The tires 26 and wheels may be located at various positions on the vehicle 20, e.g., one at a right-front corner, one at a left-front corner, one at a right-rear corner, and one at a left-rear corner. Some of the tires 26, such as the front tires 26, may be movable to change a steering angle of the vehicle 20, e.g., angling toward a right or left to control a direction of travel of the vehicle 20.

The computer 24, implemented via circuits, chips, and/or other electronic components, is included in the system 22 for carrying out various operations, including as described herein. The computer 24 is a computing device that generally includes a processor and a memory, the memory including one or more forms of computer-readable media, and storing instructions executable by the processor for performing various operations, including as disclosed herein. The memory of the computer 24 further generally stores data received via various communications mechanisms; e.g., the computer 24 is generally configured for communications on a communication network 30 or the like, and/or for using other wired or wireless protocols, e.g., Bluetooth, cellular, 3G, 4G, etc. The computer 24 may also have a connection to an onboard diagnostics connector (OBD-II). Via the communication network 30 and/or other wired or wireless mechanisms, the computer 24 may transmit and receive messages to and from various devices in and out of the vehicle 20, e.g., tire pressure sensors 28, cameras 32, other sensors 34, etc. Although one computer 24 is shown in FIG. 1 for ease of illustration, it is to be understood that the computer 24 could include, and various operations described herein could be carried out by, one or more computing devices. The communication network 30 may facilitate wired or wireless communication among the various components in accordance with a number of communication protocols such as controller area network (CAN), a communication bus, Ethernet, WiFi, Local Interconnect Network (LIN), and/or other wired or wireless mechanisms.

The tire pressure sensors 28 detect pressure of each of the tires 26. Each of the tire pressure sensors 28 may include a pressure sensor (e.g., a conventional sensor configured to detected air pressure in a tire), a battery, a transmitter, a receiver, and an electronic control unit. The tire pressure sensors 28 may be internal, e.g., supported within the tires 26. The tire pressure sensors 28 may be external, e.g., supported outside the tires 26, such as by a valve stem. The tire pressure sensors 28 are in wireless communication with the computer 24, e.g., via the communication network 30, and are free from being in wired communication with the computer 24.

The tire pressure sensors 28 may operate in a "high power" state and a "low power" state. The tire pressure sensors 28 in the "low power" state consume less energy, e.g., from the battery, as compared to in the "high power" state. For example, in the "low power" state the tire pressure sensor 28 may refrain from detecting the pressure of the tire 26 and from transmitting data. As another example, in the "low power" state the tire pressure sensor 28 may detect the pressure of the tire 26 and transmit data less often than in the "high power" state, e.g., one detection and transmission per week in the "low power" state and one detection and transmission per minute in the "high power" state.

Figure 3:
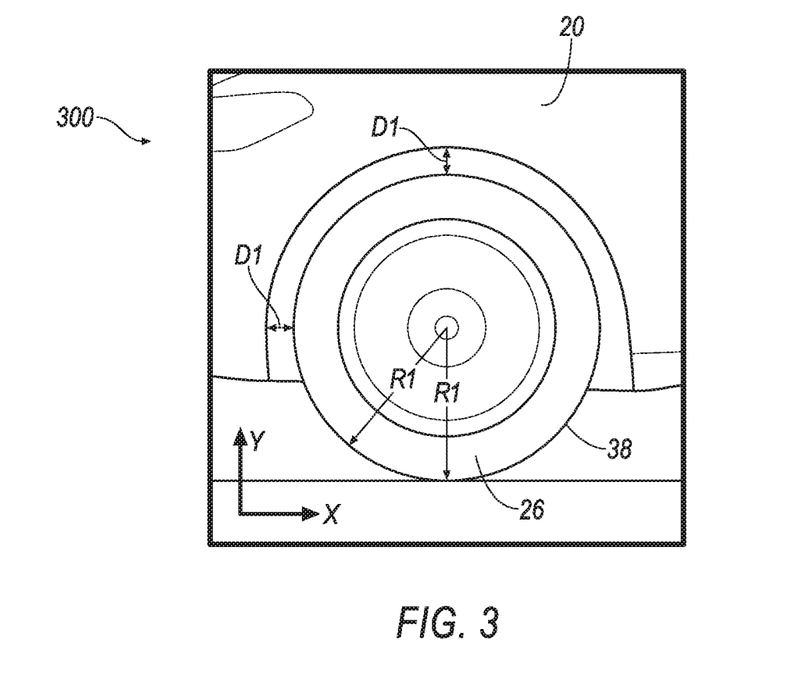
FIG. 3 is an illustration of an image captured by the tire pressure monitoring system.
Figure 4:
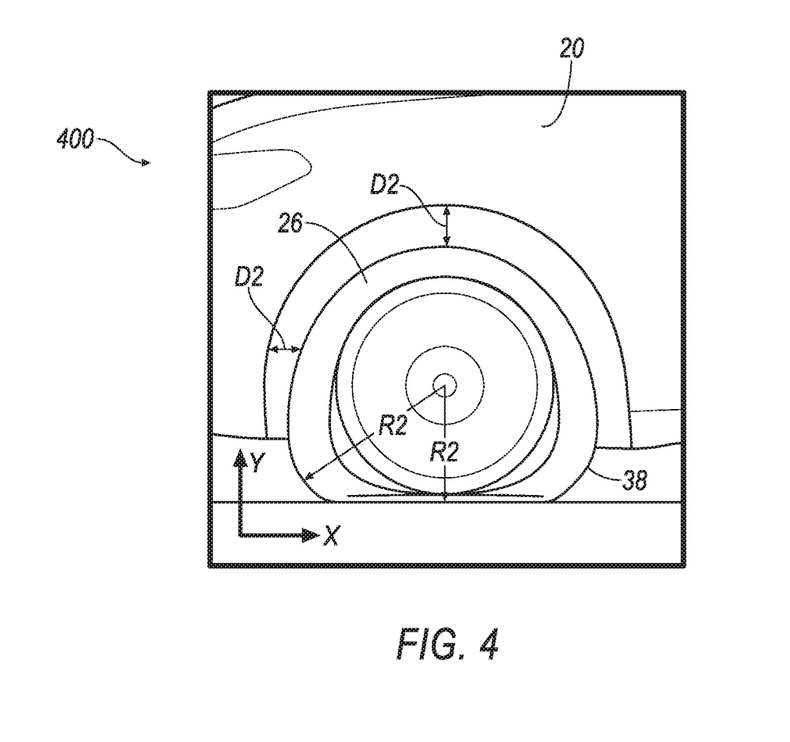
FIG. 4 is an illustration of another image captured by the tire pressure monitoring system.

Cameras 32 generate data specifying images 300, 400 captured by the camera 32. The data may specify a plurality of pixels arranged in a grid, e.g., defining an X-Y coordinate system. The data may specify a color, brightness, hue, etc., of each pixel. The cameras 32 include circuits, chips and other electronic components, e.g., image sensors, such as CCD or CMOS sensors. Cameras 32 may be supported by the vehicle 20, e.g., by a side view mirror, within a wheel well, or at any other suitable position on or in the vehicle 20 that permits the cameras 32 to capture images 300, 400 of the tires 26. Cameras 32 may be remote from the vehicle 20. For example, cameras 32 may be supported by infrastructure such as a parking structure, a dedicated fixed support structure, etc. The cameras 32 are in communication with the computer 24, e.g., via the communication network 30. Each of the cameras 32 may be actuated to capture an image in response to receiving a command from the computer 24.

The vehicle 20 may include additional sensors 34. The sensors 34 may detect internal states of the vehicle 20, for example, wheel speed, steering angle, wheel orientation, and/or engine and transmission data. The sensors 34 may detect the position or orientation of the vehicle 20, for example, global positioning system (GPS) sensors; accelerometers such as piezo-electric or microelectromechanical systems (MEMS) sensors; gyroscopes such as rate, ring laser, or fiber-optic gyroscopes; inertial measurements units (IMU); and magnetometers. The sensors may detect the external world, for example, radar sensors, scanning laser range finders, light detection and ranging (LIDAR) devices, and image processing sensors. The vehicle 20 may further include communications devices, for example, vehicle-to-infrastructure (V2I) or vehicle-to-vehicle (V2V) devices.

FIGS. 3 and 4 illustrate images 300, 400 of one of the tires 26 captured by one of the cameras 32. FIG. 3 illustrates an image 300 captured by the camera 32 upon shutdown of the vehicle 20. FIG. 4 illustrates an image 400 captured by the camera 32 upon subsequent startup of the vehicle 20.

The computer 24 is programmed to, i.e., typically the memory stores instruction executable by the processor to acquire images 300, 400 of the tires 26. For example, the computer 24 may transmit a command to one or more of the cameras 32, the command specifying capture and transmission of an image to the computer 24. The computer 24 may transmit the command to one or more specific cameras 32, e.g., via the communication network 30 to the camera 32 positioned to capture images of the left-front tire 26. The computer 24 may receive images 300, 400 from the camera 32, e.g., via the communication network 30. The computer 24 may store the received images 300, 400 in memory. The computer 24 may acquire images 300, 400 of the tires 26 upon shutdown of the vehicle 20 and upon startup of the vehicle 20. The computer 24 may acquire images 400 of the tires 26 in response to determining that the tire 26 is unmoved since shutdown of the vehicle 20.

The computer 24 may be programmed to determine whether each of the tires 26 is one of moved or unmoved. Movement of the tire 26 is a change in a position on the ground, and/or orientation, of the tire 26, i.e., movement of a tire 26 means that a wheel supporting the tire 26 has moved; a change in shape of a tire 26 caused by a decrease in air pressure in the tire 26 is not movement of the tire 26.

The computer 24 may determine that one of the tires 26 is moved based on data from the sensors 34 specifying movement of the tire 26 relative to the body 36 of the vehicle 20. For example, the computer 24 may determine that one of the tires 26 is moved based on receiving data from the sensors 34 specifying that one of the tires 26 has been removed from the vehicle 20, e.g., from a contact sensor, a proximity sensor, or other suitable sensor. As another example, the computer 24 may determine that one of the tires 26 is moved based on data from the sensors 34 specifying rotation of the tire 26 relative to the body 36 of the vehicle 20, e.g., from a wheel speed sensor or other suitable sensor. As one more example, the computer 24 may determine that one of the tires 26 is moved based on data from the sensors 34 specifying change of a steering angle of one of the tires 26, e.g., a position sensor or other suitable sensor.

The computer 24 may determine that the tire 26 is unmoved when movement of the tire 26 is not detected over a specified period of time, e.g., between shutdown and subsequent startup of the vehicle 20. For example, the computer 24 may determine that the tire 26 is unmoved based on not receiving data specifying removal of the tire 26, rotation of the tire 26, or change of steering angle of the tire 26. The computer 24 may determine whether each of the tires 26 is either moved or unmoved upon startup of the vehicle 20, e.g., since a most recent shutdown of the vehicle 20.

The computer 24 may determine that a first ambient temperature during shutdown of the vehicle 20 is different from a second ambient temperature during subsequent startup of the vehicle 20. For example, the computer 24 may detect the ambient temperature at shutdown of the vehicle 20, e.g., based on data from the sensors 34, and store such temperature in the memory. The computer 24 may then detect the ambient temperature at a subsequent startup of the vehicle 20 and store such temperature in memory. The computer 24 may then calculate the difference in the stored temperatures.

The computer 24 may determine the first ambient temperature is different than the second ambient temperature when the difference between the temperatures is greater than a threshold amount, e.g., 20 degrees Celsius. The threshold amount may be determined by empirical analysis and/or computer simulation to identify a minimum difference in temperature where air pressure of the tire 26 is decreased by a specified amount. The specified amount of air pressure decrease may be determined based on characteristics of the tire 26 and the vehicle 20, e.g., optimal air pressure of the tire 26, minimum air pressure for the tire 26, etc.

The computer 24 is programmed to determine that images 300, 400 captured by one of the cameras 32 are different from each other, e.g., the first image 300 captured during shutdown of the vehicle 20 and the second image 400 captured during a subsequent startup of the vehicle 20. For example, the computer 24 may compare characteristics, e.g., color, brightness, hue, X-Y position, etc., of pixels of the first image 300 with characteristics of pixels of the second image 400. The computer 24 may use image recognition techniques to identify the tire 26 in the first image 300 and in the second image 400 and may compare the tire 26 in the first image 300 with the tire 26 in the second image 400. For example, the computer 24 may use a machine learning program or other image recognition program that compares pixels identified in the first image 300 as the tire 26 with pixels in the second image 400 identified as the tire 26 to identify and compare tires 26.

The computer 24 may determine that the first image 300 is different than the second image 400 based on a position of the tire 26 relative to a body 36 of the vehicle 20 in the first image 300 being different from a position of the tire 26 relative to the body 36 of the vehicle 20 in the second image 400. For example, the computer 24 may identify features of the tire 26 (such as an outer perimeter 38) and of the body 36 (such as an edge 40 of a wheel well) in the first image 300 and the second image 400. The computer 24 may calculate a first distance D1 between the tire 26, e.g., the perimeter 38, and body 36, e.g., the edge 40, in the first image 300. Further, the computer 24 may calculate a second distance D2 between the tire 26 and the edge 40 in the second image 400. The distances D1, D2 may be measured along the x-axis of the images 300, 400 at specified y-positions. The distances D1, D2 may be measured along the y-axis of the images 300, 400 at a specified x-positions. The distances D1, D2 may be measured radially relative to the tire 26. The distances D1, D2 may be measured between along any suitable axis and at any suitable position on the tire 26 and body 36 such that a change in position of tire 26 relative to the body 36 is specified by the change in distances D1, D2.

The difference between the distances D1, D2 of the first image 300 and the second image 400 may be compared to a threshold amount, e.g., 3 millimeters. The threshold amount may be determined by empirical analysis and/or computer simulation to identify a minimum difference in distances D1, D2 for images 300, 400 of the tire 26 where air pressure of the tire 26 is decreased by a specified amount between capture of the first image 300 and the second image 400. The specified amount of air pressure decrease may be determined based on characteristics of the tire 26 and the vehicle 20, e.g., optimal air pressure of the tire 26, minimum air pressure for the tire 26, etc. The computer 24 may determine that the first image 300 is different than the second image 400 when the difference between the distances D1, D2 is greater than the threshold amount.

The computer 24 may determine that the first image 300 is different than the second image 400 based on a shape of the tire 26 in the first image 300 being different from a shape of the tire 26 in the second image 400. For example, the computer 24 may identify features of the tire 26, e.g., the outer perimeter 38, in the first image 300 and the second image 400. The shape of the tire 26 may be defined by the identified outer perimeter 38 of the tire 26 in the images 300, 400. For example, the outer perimeter 38 may define a curve having one or more radius lengths R1, R2. The computer 24 may calculate a difference of the radius lengths R1 of the outer perimeter 38 of the tire 26 in the first image 300 with the radius lengths R2 of the second image 400. The computer 24 may calculate a difference in the ranges of radius lengths R1, R2 of the tires 26 in the images 300, 400, e.g., specifying how far the tire 26 is from being perfectly round. The range of the radius lengths R1, R2 of each of the images 300, 400 is a difference between the longest and shortest radius lengths R1, R2 of the tire 26 of one of the images 300, 400

The difference between the shapes of the first image 300 and the second image 400 may be compared to a threshold amount, e.g., 5 millimeters. The threshold amount may be a difference of the radius lengths R1, R2 of the outer perimeters 38 of the tires 26, e.g., a difference of a maximum radius length R1 of one image 300 with a maximum radius length R2 from another image 400. The threshold amount may be a difference in the ranges of radius lengths R1, R2 of the tires 26, e.g., a difference of the range between maximum and minimum radius lengths R1, R2 of the tire 26 in one image 300 with those of the tire 26 in another image 400.

The threshold amount may be determined by empirical analysis and/or computer simulation to identify a minimum difference in radius lengths R1, R2 and/or ranges of radius lengths R1, R2 for images 300, 400 of the tire 26 where air pressure of the tire 26 is decreased by a specified amount between capture of the images 300, 400. The specified amount of air pressure decrease may be determined based on characteristics of the tire 26 and the vehicle 20, e.g., optimal air pressure of the tire 26, minimum air pressure for the tire 26, etc. The computer 24 may determine that the first image 300 is different than the second image 400 when the difference between the radius lengths R1, R2 and/or the range of radius lengths R1, R2 is greater than the threshold amount.

The computer 24 is programmed to actuate various components of the vehicle 20. The computer 24 may actuate the components by transmitting commands, e.g., via the communication network 30. The computer 24 may actuate the memory, e.g., to store data such as data specifying an error code (further described below). The computer 24 may actuate the pressure sensors 28, e.g., to the "high power" or the "low power" state. The computer 24 may actuate one or more components of the vehicle 20 in response to determining that the first image 300 is different that the second image 400.

The computer 24 may by programmed to store error codes, e.g., in a memory of the computer 24. An error code is an indication that one or more components, systems, etc., of the vehicle 20 are in error, i.e., in a condition that is not optimal for operation of the vehicle 20. The error code may include data specifying the difference between images 300, 400 of the tires 26. The stored error code may include data specifying a position of the tire 26 relative to the vehicle 20, e.g., a left-front tire 26. The computer 24 may store the error code in the memory of the computer 24 in response to determining that the images 300, 400 captured by one of the cameras 32 are different from each other, e.g., as described herein.

The computer 24 may be programmed to actuate the tire pressure sensors 28. For example, the computer 24 may wirelessly transmit a command to the tire pressure sensors 28, e.g., via the communication network 30. The command can specify to detect a pressure of the respective tire 26 and/or to actuate the tire pressure sensors 28 to the "low power" or "high power" state. The computer 24 may transmit the command to a specific tire pressure sensor 28, e.g., the tire pressure sensor 28 at the left rear tire 26. The computer 24 may actuate one or more of the tire pressure sensors 28 in response to determining one or more of the tires 26 is moved since a most recent shutdown of the vehicle 20. The computer 24 may actuate one or more of the tire pressure sensors 28 as part of the shutdown and/or startup of the vehicle 20. The computer 24 may actuate one or more of the tire pressure sensors 28 in response to determining that a first ambient temperature during shutdown of the vehicle 20 is different from a second ambient temperature during subsequent startup of the vehicle 20.

The computer 24 may be programmed to receive and store, e.g., in a memory, data specifying the pressure from the tire pressure sensors 28. The data specifying the pressure may include data specifying a position of the tire 26 relative to the vehicle 20, e.g., the right-front tire 26.

Figure 5:
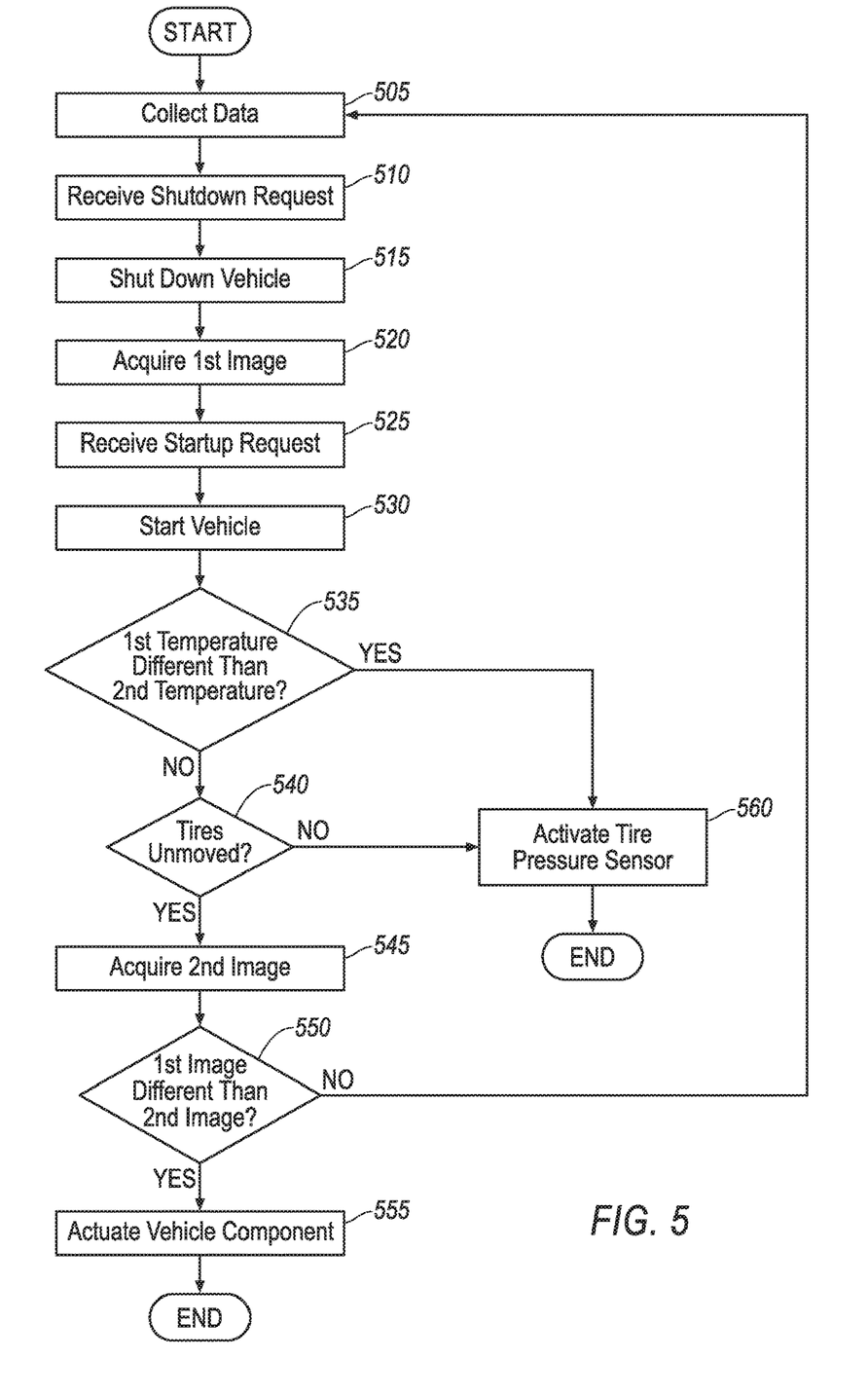
FIG. 5 is a flow chart illustrating a process for controlling the tire pressure monitoring system.

FIG. 5 is a process flow diagram illustrating an exemplary process 500 for operating the system 22. The process 500 begins in a block 505 in which the computer 24 receives data from the sensors 34, e.g., via the communication network 30. The computer 24 may receive such data substantially continuously, at time intervals, i.e., periodically, e.g., every 50 milliseconds, or sporadically, e.g., when data is transmitted to the computer 24. The computer 24 may store the data, e.g., in the memory.

Next, at a block 510, the computer 24 receives a shutdown request, e.g., from a user input to the vehicle 20 (such as an ignition switch), a remote device (such as a smart phone or key fob), etc.

Next, at a block 515, and in response to receiving the shutdown request at the block 510, the computer 24 shuts down the vehicle 20, e.g., by commanding various systems of the vehicle 20 to "off" or "low power" states, e.g., as described herein. As part of shutting down the vehicle 20, the computer 24 may actuate one or more of the tire pressure sensors 28 to the "low power" state. For example, the computer 24 may wirelessly transmit commands specifying the "low power" state to the tire pressure sensors 28 via the communication network 30.

Next, at a block 520, and upon shutdown of the vehicle 20, the computer 24 acquires a first image 300 of one or more tires 26 of the vehicle 20. For example, the computer 24 may transmit a command to one of the cameras 32, and then receive and store the image 300 from the camera 30. Additionally, and upon shutdown, the computer 24 may detect a first ambient temperature proximate the vehicle 20, e.g., based on data from the sensors 34. The computer 24 may store such temperature in the memory.

Next, at a block 525, the computer 24 receives a startup request, e.g., from a user input to the vehicle 20 (such as an ignition switch), a remote device (such as a smart phone or key fob), etc.

Next, at a block 530, and in response to receiving the startup request, the computer 24 starts the vehicle 20, e.g., by commanding various systems of the vehicle 20 to "on" or "high power" states, e.g., as described above. Additionally upon startup the computer 24 may detect a second ambient temperature proximate the vehicle 20, e.g., based on data from the sensors 34, and store such temperature in memory.

Next, at a block 535, the computer 24 determines whether the first ambient temperature stored at the block 520 during the shutdown is different from the second ambient temperature stored at the block 530 during startup, e.g., by a threshold amount as described above. In response to determining the first ambient temperature is different than the second ambient temperature by the threshold amount the process moves to a block 560. In response to determining the first ambient temperature is not different that the second ambient temperature by the threshold amount the process 500 moves to a block 540.

At the block 540, and upon startup of the vehicle 20, the computer 24 determines whether one or more of the tires 26 are unmoved since the shutdown at the block 515. The computer 24 may determine whether the tires 26 are unmoved by detecting as least one of removal of the tire 26, rotation of the tire 26, or change of a steering angle of the tire 26, e.g., based on data from the sensors 34 and as described above. In response to determining one or more of the tires 26 are unmoved, the process 500 moves to a block 545. Upon determining one or more of the tires 26 are not unmoved, i.e., are moved, the process 500 moves to the block 560. The process 500 may advance to both blocks 545 and 560, e.g., to the block 545 with respect to the tires 26 that are not moved, and to the block 560 with respect to tires 26 that are moved.

At the block 545, the computer 24 acquires a second image 400 of the tire 26, e.g., by transmitting a command to the camera 32 that captured the image 300, and then receiving and storing the second image 400 of the tire 26 from the camera 32.

Next, at a block 550 the computer 24 determines first image 300 is different that the second image 400, e.g., based on a position of the tire 26 relative to a body 36 of the vehicle 20 in the first image 300 being different from a position of the tire 26 relative to the body 36 of the vehicle 20 in the second image 400 by a threshold amount and/or based on a shape of the tire 26 in the first image 300 being different from a shape of the tire 26 in the second image 400 by a threshold amount. In response to determining the first image 300 is different than the second image 400 the process 500 moves to a block 555. In response to determining the first image 300 is not different than the second image 400 the process 500 returns to the block 505. The computer 24 moves to the block 505 without actuating the tire pressure sensor 28 to the "high power" state, e.g., maintaining the tire pressure sensor 28 in the lower power state until acquired images 300, 400 are determined as different from each other in a subsequent repetition of the process 500.

At the block 555 the computer 24 actuates a component of the vehicle 20, e.g., by transmitting a command to one or more vehicle component via the communication network 30. For example, the computer 24 may store an error code in the memory of the computer 24 including data specifying a position of the tire 26 relative to the vehicle 20, actuate a tire pressure sensor 28 of the tire 26 that is different in the images 300, 400, e.g., to the "high-power" state. After the block 555 the process 500 may end. Alternately, the process 500 may return to the block 505.

At the block 560 the computer 24 actuates a tire pressure sensor 28 of the tire 26 to the "high power" state, e.g., by transmitting a command to the tire pressure sensor 28 via the communication network 30. After the block 560 the process 500 may end. Alternately, the process 500 may return to the block 505

With regard to the process described herein, it should be understood that, although the steps of such process have been described as occurring according to a certain ordered sequence, such process could be practiced with the described steps performed in an order other than the order described herein. It further should be understood that certain steps could be performed simultaneously, that other steps could be added, or that certain steps described herein could be omitted. In other words, the description of the process herein is provided for the purpose of illustrating certain embodiments and should in no way be construed so as to limit the disclosed subject matter.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

The terms "in response to" and "upon" herein specify a causal relationship in addition to a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising a computer having a processor and a memory storing instructions executable by the processor to:
   acquire a first image of a tire of a vehicle upon shutdown of the vehicle;
   then, upon startup of the vehicle, and in response to determining that the tire is unmoved since the shutdown and, in response, acquire a second image of the tire; and
   actuate a component of the vehicle in response to determining that the first image is different than the second image.

2. The system of claim 1, wherein the instructions further include instructions to, upon startup of the vehicle, determine that the tire is moved since the shutdown and, in response, actuate a tire pressure sensor of the tire.

3. The system of claim 1, wherein the instructions further include instructions to determine that the tire is moved by detecting as least one of removal of the tire, rotation of the tire, or change of a steering angle of the tire.

4. The system of claim 1, wherein the instructions further include instructions to store an error code in the memory of the computer in response to determining that the first image is different that the second image.

5. The system of claim 4, wherein the instructions further include instructions to store data specifying a position of the tire relative to the vehicle along with the error code.

6. The system of claim 1, wherein the instructions further include instructions to determine that the first image is different than the second image based on a position of the tire relative to a body of the vehicle in the first image being different from a position of the tire relative to the body of the vehicle in the second image by a threshold amount.

7. The system of claim 1, wherein the instructions further include instructions to determine that the first image is different than the second image based on a shape of the tire in the first image being different from a shape of the tire in the second image by a threshold amount.

8. The system of claim 1, wherein the instructions further include instructions to actuate a wireless tire pressure sensor to a low power state upon shutdown of the vehicle.

9. The system of claim 8, wherein the instructions further include instructions to maintain the wireless tire pressure sensor in the lower power state until acquired images are determined as different from each other.

10. The system of claim 1, further comprising a tire pressure sensor in wireless communication with the computer.

11. The system of claim 1, wherein the instructions further include instructions to determine that a first ambient temperature during shutdown of the vehicle is different from a second ambient temperature during startup of the vehicle and, in response, actuate a tire pressure sensor of the tire.

12. A method, comprising:
acquiring a first image of a tire of a vehicle upon shutdown of the vehicle;
then, upon startup of the vehicle, and in response to determining that the tire is one of moved or unmoved since the shutdown;
in response to determining the tire is unmoved since the shutdown, acquiring a second image of the tire and actuating a component of the vehicle in response to determining that the first image is different than the second image; and
in response to determining the tire is moved since the shutdown, actuating a tire pressure sensor of the tire.

13. The method of claim 12, further comprising determining that the tire is moved by detecting as least one of removal of the tire, rotation of the tire, or change of a steering angle of the tire.

14. The method of claim 12, further comprising storing an error code in response to determining that the first image is different that the second image.

15. The method of claim 14, further comprising storing data specifying a position of the tire relative to the vehicle along with the error code.

16. The method of claim 12, further comprising determining that the first image is different than the second image based on a position of the tire relative to a body of the vehicle in the first image being different from a position of the tire relative to the body of the vehicle in the second image by a threshold amount.

17. The method of claim 12, further comprising determining that the first image is different than the second image based on a shape of the tire in the first image being different from a shape of the tire in the second image by a threshold amount.

18. The method of claim 12, further comprising actuating a wireless tire pressure sensor to a low power state upon shutdown of the vehicle.

19. The method of claim 18, further comprising maintaining the wireless tire pressure sensor in the lower power state until acquired images are determined as different from each other.

20. The method of claim 12, further comprising determining that a first ambient temperature during shutdown of the vehicle is different from a second ambient temperature during startup of the vehicle and, in response, actuate a tire pressure sensor of the tire.

* * * * *